United States Patent [19]
Horiuchi

[11] Patent Number: 5,095,387
[45] Date of Patent: Mar. 10, 1992

[54] ZOOM LENS
[75] Inventor: Akihisa Horiuchi, Kanagawa, Japan
[73] Assignee: Canon Kabushiki Kaisha, Tokyo, Japan
[21] Appl. No.: 554,464
[22] Filed: Jul. 19, 1990
[30] Foreign Application Priority Data
  Jul. 26, 1989 [JP] Japan .................................. 1-193774
[51] Int. Cl.[5] .......................................... G02B 15/00
[52] U.S. Cl. .................................... 359/676; 359/683
[58] Field of Search ................ 354/423, 427, 466, 470
[56] References Cited
U.S. PATENT DOCUMENTS

| | | | |
|---|---|---|---|
| 4,518,228 | 5/1985 | Sugiura . | |
| 4,618,219 | 10/1986 | Sugiura et al. . | |
| 4,621,905 | 11/1986 | Kato et al. . | |
| 4,653,874 | 3/1987 | Takahashi et al. . | |
| 4,659,187 | 4/1987 | Takahashi et al. . | |
| 4,770,510 | 9/1988 | Mukaiya | 350/423 |
| 4,802,747 | 2/1989 | Horiuchi . | |
| 4,812,024 | 3/1989 | Mukaiya . | |
| 4,854,684 | 8/1989 | Horiuchi . | |
| 4,892,397 | 1/1990 | Horiuchi | 350/423 |
| 4,934,796 | 6/1990 | Sugiura et al. . | |
| 4,988,174 | 1/1991 | Horiuchi et al. | 350/427 |
| 4,995,708 | 2/1991 | Sugiura | 350/427 |

FOREIGN PATENT DOCUMENTS
59-222807 12/1984 Japan .
60-260912 12/1985 Japan .

Primary Examiner—Paul M. Dzierzynski
Attorney, Agent, or Firm—Fitzpatrick, Cella, Harper & Scinto

[57] ABSTRACT

A zoom lens comprising, from front to rear, a first lens group of positive power, a second lens group of negative power axially movable for zooming, a third lens group axially movable for compensating for the image shift resulting from the movement of the second lens group, a fourth lens group of positive power, optical filter means and a fifth lens group of positive power, and satisfying the following condition:

$$0.7 < f4/L < 0.95$$

where f4 is the focal length of the fourth lens group and L is the distance from an image point formed by the first to third lens groups to the front principal point of the fourth lens group.

16 Claims, 4 Drawing Sheets

ZOOM LENS

BACKGROUND OF THE INVENTION

1. Field of the Invention

This invention relates to zoom lenses and, more particularly, to zoom lenses having a large relative aperture up to 1.4 in F-number and a high zoom ratio up to 15, while still maintaining good optical performance throughout the entire range of magnification, suited to photographic cameras, video cameras, etc.

2. Description of the Related Art

In the photographic cameras and video cameras, there has been a growing demand for large relative aperture, high range zoom lenses of high optical performance.

Of these, the video camera, because of its image pickup element having a relatively low sensitivity, has been calling for as large an increase in the relative aperture of the zoom lens as possible.

Besides this, in the color camera using the single tube type color image pickup tube, or other image pickup device such as CCD or like image pickup plate, in combination with a stripe filter, for the purpose of preventing mixture of colors, it is required to construct the entirety of the optical system in telecentric form so that the light beam entering the aforesaid stripe filter becomes as perpendicularly incident as possible.

Again, the CCD or MOS is now widely used as the image pickup device in the video camera. The front surface of its cover glass and the image receiving surface have, in general case, a high reflectance. For this reason, the light reflected from these surfaces scatters from the lens surfaces and on the inside of the lens barrel, arriving again at the image pickup device. The so-called ghost and flare arise from such interreflections.

Particularly when an ND filter or the like is used adjacent to the stop of the photographic lens, the interreflections between the surfaces of this filter and the stripe filter often lead to ghost images or flare spots on the image pickup device, causing the optical performance to lower extremely.

Thus, for the photographic lens to be used in the video camera, the requirement of getting good optical performance without suffering from production of harmful light rays from which the ghost and flare arise must be fulfilled.

In this respect, a proposal for getting a zoom lens of high grade imagery is made in U.S. patent application Ser. No. 223,108 filed on July 22, 1988.

In this proposal, concerning each lens surface on the image side of the stop, ray tracing is done on the assumption that the returning light ray from the image plane is reflected at that surface. The radii of curvatures of all these lens surfaces are so determined by using the bending technique that the reflected light, even if coming to focus, leads to an image toward the photographic lens away from the prescribed image plane. In such a way, the harmful light rays are removed. The reason why the lens surfaces on the object side of the stop are not considered here is that with the stop at full open aperture, because there exist light rays of various angles, the harmful light rays are distributed uniformly over the entire picture area, so that their influence is not very conspicuous, giving no problem on the actual practice. When the stop is closed down, however, the influence becomes serious. Therefore, particular attention is paid on the surfaces in rear of the stop which contribute to an interreflection when the stop is closed down.

By the way, when the stop is closed down, the diaphragm blades come to produce a considerable influence on the diffracting phenomenon, causing the image quality to deteriorate. So, to avert this phenomenon, the acceptable minimum size of aperture opening has to be set at a relatively large value. It is known to provide a technique of using an ND filter for fulfilling the light reduction function when a smaller aperture size than this minimum size is necessary.

The use of this filter, however, gives rise to a new problem. For example, as this filter is put in a space constituting part of an afocal system, a light beam coming backward from the image pickup device is reflected again at this filter. The reflected light beam is again focused, forming a ghost image near the image pickup device. And, a technique of preventing this ghost is proposed in U.S. Pat. No. 4,892,397. The present invention falls in improvements of this zoom lens.

Meanwhile, as the zoom lens suited to the video camera, mention may be made of U.S. Pat. Nos. 4,618,219, 4,621,905, 4,659,187, 4,653,874 and 4,518,228. There are other ones in Japanese laid-Open Patent Applications Nos. Sho 59-222807, Sho 60-260912 and Sho 61-20291 and U.S. Pat. No. 4,812,024.

SUMMARY OF THE INVENTION

A first object of the invention is to provide a photographic lens capable of obtaining an image of good quality.

A second object of the invention is to provide a photographic lens which suffers little ghost and flare.

A third object of the invention is to provide a zoom lens suited to a video camera using the solid-state image pickup device.

And, a zoom lens of the invention includes, from front to rear, a first lens group of positive power, a second lens group of negative power axially movable for zooming, a third lens group for compensating for the image shift resulting from the movement of the second lens group, a fourth lens group of positive power, optical filter means and a fifth lens group of positive power, satisfying the following condition:

$$0.7 < f4/L < 0.95 \tag{a}$$

where f4 is the focal length of the fourth lens group and L is the distance from an image point formed by the first lens group to the third lens group to the front principal point of the fourth lens group.

BRIEF DESCRIPTION OF THE DRAWINGS

FIG. 2(A) and FIG. 3(A) show the aberrations in the wide-angle end, FIG. 2(B) and FIG. 3(B) in the intermediate position, and FIG. 2(C) and 3(C) in the telephoto end.

In the drawings, I, II, III, IV and V denote the first, second, third, fourth and fifth lens groups, respectively. ΔM represents the meridional image surface, and ΔS the sagittal image surface. d stands for the spectral d-line, and g for the spectral g-line. SP denotes the stop.

DETAILED DESCRIPTION OF THE PREFERRED EMBODIMENT

Figure 1:
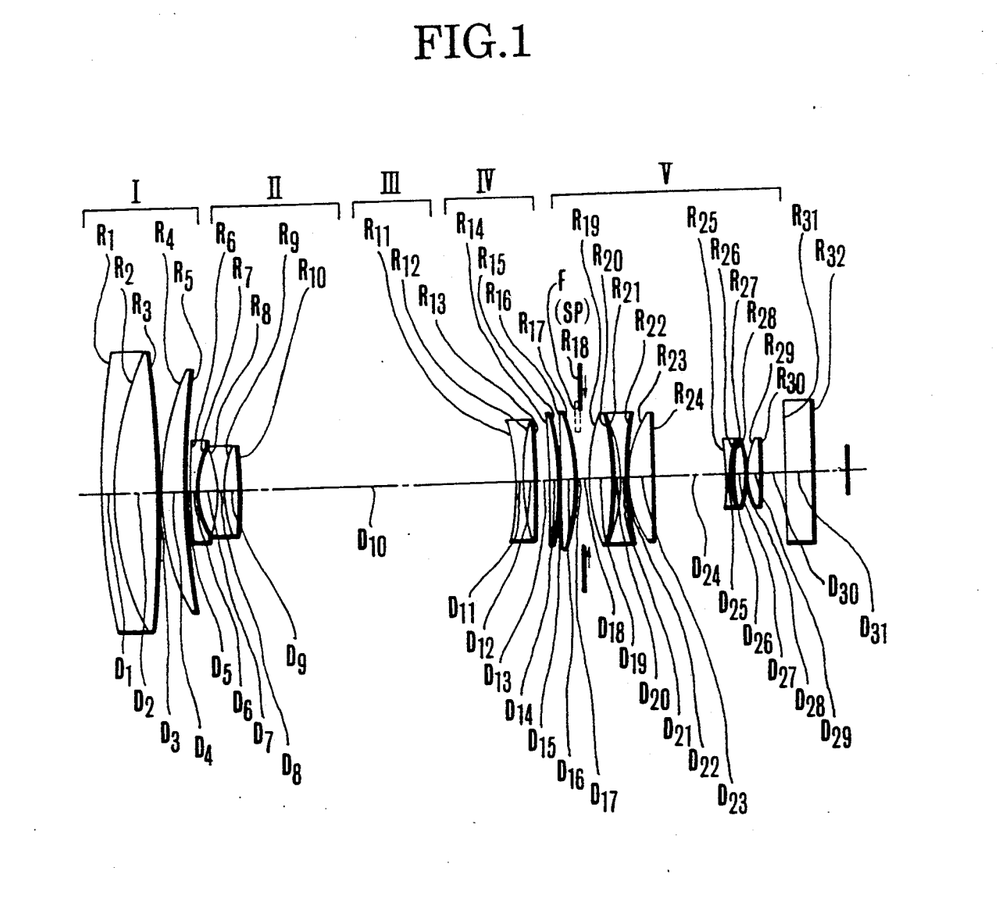
FIG. 1 is a longitudinal section view of a numerical example 1 of a lens of the invention.
Figure 2A:
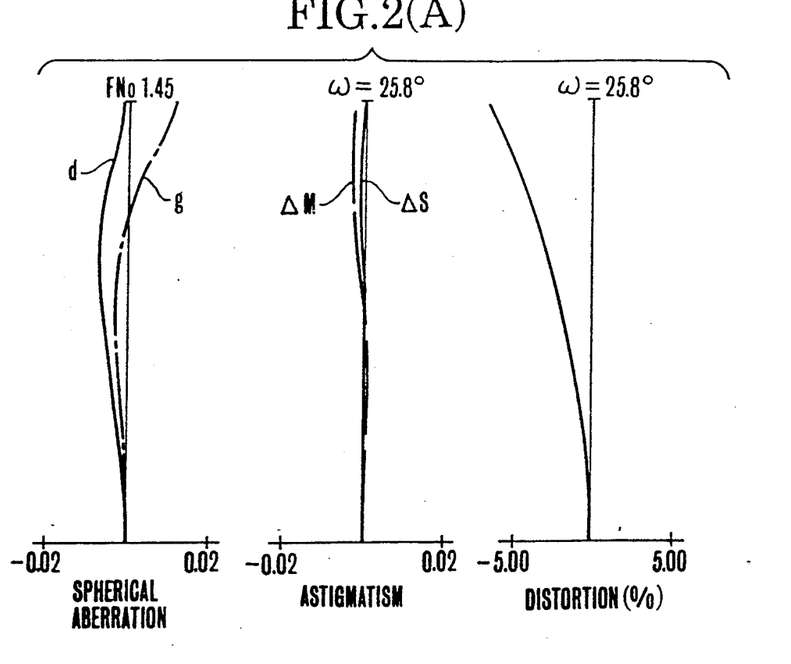
FIGS. 2(A), 2(B) and 2(C) and FIGS. 3(A), 3(B) and 3(C) are graphic representations of the aberrations of the numerical examples 1 and 2 of lenses of the invention, respectively. In the graphs.
Figure 2B:
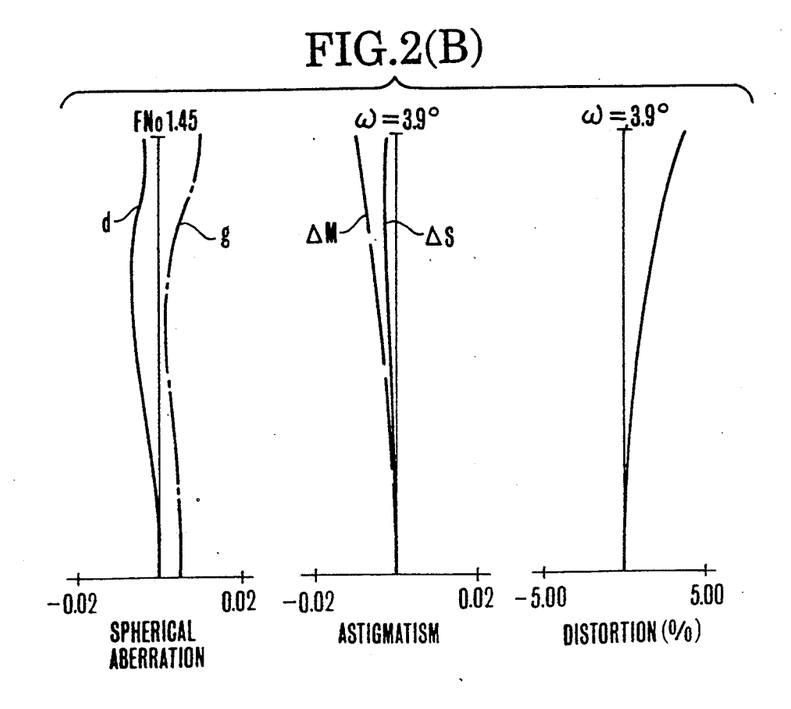
Figure 2C:
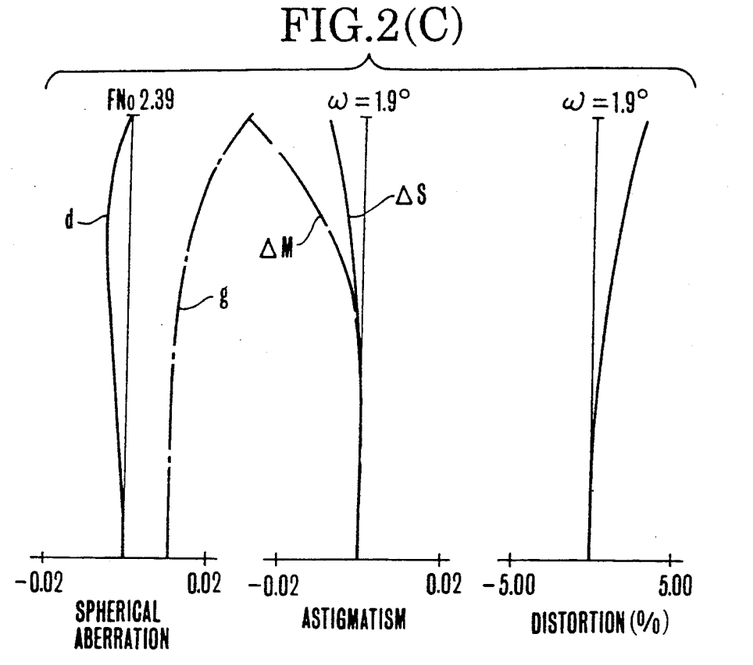

FIG. 1 shows an example of a specific zoom lens of the invention comprising, from front to rear, a first lens group I of positive power for focusing, a second lens group II of negative power for varying the image magnification in a range as it axially monotonously moves, a third lens group III of negative power for compensating for the shift of an image plane with the variation of the image magnification as it axially moves in a locus convex toward the object side, a fourth lens group IV of positive power for making almost convergent the light beam from the third lens group, an axially stationary stop SP and a fixed fifth lens group V having the image forming function. It is to be noted that the stop SP is associated with an ND filter F having the light reducing function, so that when the stop SP is closed down, the filter F enters the optical axis to cover the minimum aperture opening with the result that diffraction is prevented from occurring at the minimum aperture.

In the present embodiment, in such a zoom type, by giving the five constituent lens groups a specific configuration as described above, accompanying aberrations with the large increases of the relative aperture and the zoom ratio are corrected well for good stability of optical performance throughout the entire range of variation of the focal length.

Particularly, the residual aberrations of the focal length varying system, for example, spherical aberration and comatic aberration, are corrected in good balance, while still maintaining a shortening of the total length of the entire lens system to be achieved.

Also, a special range for the refractive power of the fourth lens group is given by the inequalities of condition (a), in other words, the light beam emerging from the fourth lens group is made to get a slight convergent tendency. Otherwise, when the ND filter or the like is arranged in the neighborhood of the stop, the reflected light from the image receiving surface of the image pickup device would be reflected at this filter surface to enter again the image pickup device, on whose image receiving surface ghost and flare appear. This is advantageously avoided by satisfying that condition.

When the upper limit of the inequalities of condition (a) is exceeded, the light beam nears parallelism. This leads to an increase in the difficulty of effectively removing the ghost and flare. When the lower limit is exceeded, the light beam too much converges, causing the variation of aberrations to increase objectionably.

Also, in the present embodiment, to improve correction mainly of spherical aberration over the entire zooming range, it is recommended to construct the fourth lens group in such a way as to have two positive lenses.

Meanwhile, to minimize variation of longitudinal chromatic aberration with zooming, it is recommended to construct the third lens group in such a way as to have a doublet consisting of a negative first lens of which both surfaces are concave and a positive second lens either of which both surfaces are convex or in meniscus form convex toward the object side, cemented together.

Also, in the present embodiment, to obtain high optical performance over the entire picture area with the limitation of the variation with zooming of aberration to a minimum, it is recommended to specify the form and the construction and arrangement of the constituent lenses of the first to fourth lens groups as follows.

The first lens group has a negative meniscus-shaped first lens convex toward the object side, a bi-convex second lens, these lenses being cemented together, and a positive meniscus-shaped third lens convex toward the object side. The second lens group has a negative first lens of convex curvature toward the object side, a bi-concave second lens and a positive third lens, the second and third lenses being cemented together. The fourth lens group has a positive first lens and a positive second lens, both having strong refracting surfaces at the image side.

Further, letting the focal length of the i-th lens group be denoted by fi, the refractive index and Abbe number of the material of the j-th lens in the i-th lens group by $Ni,j$ and $vi,j$ respectively, and the mean value of the Abbe numbers of the materials of the two positive lenses in the fourth lens group by $v4$ and the shortest and longest focal lengths of the entire lens system by $fW$ and $fT$ respectively, the following conditions are satisfied:

$$2.0 < (fT/f1)^2 < 2.4 \tag{1}$$

$$-1.96 < f2/fW < -1.75 \tag{2}$$

$$1.65 < N1,3 < 1.75 \tag{3}$$

$$21 < v3,1 - v3,2 < 24 \tag{4}$$

$$55 < v4 < 75 \tag{5}$$

Next, each of the above-cited conditions is explained.

The inequalities of condition (1) concern with the ratio of the focal length of the first lens group to the longest focal length of the entire lens system and are to properly set a sensitivity in position of the first lens group. When the sensitivity of the first lens group is large beyond the upper limit, the assembling accuracy becomes severe and manufacturing becomes difficult. When, as the focal length of the first lens group becomes long, the sensitivity is too weak as exceeding the lower limit, the diameter of the front lens members gets increasing objectionably.

The inequalities of condition (2) concern with the ratio of the focal length of the second lens group to the shortest focal length of the entire lens system and have an aim mainly of well correcting variation of aberrations with zooming. When the focal length of the second lens group is long beyond the upper limit, the entire lens system gets a long total length. Again, when it is exceeded under the condition (1), the first lens group and the second lens group become liable to physically interfere with each other. Conversely when the lower limit is exceeded, variation of aberrations with zooming increases to lower the optical performance objectionably.

The inequalities of condition (3) concern with the refractive index of the material of the third lens in the first lens group and has an aim mainly of correcting distortion in good balance. When the upper limit is exceeded, the distortion in the wide-angle end increases. When the lower limit is exceeded, halo comes to increase in the telephoto end objectionably.

The inequalities of condition (4) concern with the difference of the Abbe numbers of the materials of the negative first lens and the positive second lens in the third lens group and have an aim mainly of well correcting variation of longitudinal chromatic aberration with zooming. When the upper limit is exceeded, the varied amount with zooming decreases, but the longitudinal chromatic aberration gets under-corrected throughout. Conversely when the lower limit is exceeded, the amount of varied longitudinal chromatic aberration increases so that good correction becomes difficult to do.

The inequalities of condition (5) concern with the mean value of the Abbe numbers of the materials of the two positive lenses in the fourth lens group and have an aim mainly of well correcting longitudinal chromatic aberration. By the condition (4), the varied amount of longitudinal chromatic aberration is decreased, and by the condition (5), the longitudinal chromatic aberration is set to an appropriate value. When the upper limit is exceeded, the longitudinal chromatic aberration gets over-corrected throughout. When the lower limit is exceeded, it comes to be under-corrected.

Next, in the present embodiment, to effectively prevent ghost images and a flare spot from arising on the reflection at the surface of the image pickup device, it is recommended to set forth some of the rules of design for the fifth lens group as follows:

That is, the fifth lens group has, in the order from the object side, a front lens sub-group and a rear lens sub-group with a largest air separation in the fifth lens group therebetween. The front lens sub-group has, from front to rear, a first lens of which both lens surfaces are convex, a negative second lens of concave curvature at the object side and a positive third lens having a strong refracting surface at the object side, totaling three lenses. The rear lens sub-group has a negative fourth lens of concave curvature at the image side, a fifth lens of strong curvature at the image side, of which both lens surfaces are convex and a positive sixth lens of strong curvature at the object side, of which both lens surfaces are convex, wherein letting the radius of curvature of the i-th lens surface counting from front in this fifth lens group be denoted by R5,i, the following conditions are satisfied:

$$0.02 < fW/R5,4 < 0.21 \quad (6)$$

$$-0.20 < fW/R5,7 < -0.01 \quad (7)$$

$$55 < (\nu 5,1 + \nu 5,3)/2 < 70 \quad (8)$$

The inequalities of condition (6) concern with the radius of curvature of the fourth lens surface, counting from front, in the fifth lens group and have an aim mainly of reducing coma and bringing the interreflection between the image pickup device and the aforesaid lens surface which becomes a source for producing harmful light such as ghost and flare into focus at a position away from the image plane toward the photographic lens. When the curvature is small beyond the upper limit, inward coma is generated, which is difficult to correct at the other lens surfaces. When the curvature becomes large beyond the lower limit, the interreflections between the image pickup device and the lens surfaces lead to harmful light focusing itself at or near the image plane of the photographic lens or farther than the image plane away from the photographic lens. This is not permissible.

The inequalities of condition (7) have a similar aim to that of the inequalities of condition (6), of bringing the position of the ghost images arising from the interreflection between the image pickup device and the lens surfaces toward the photographic lens and correcting curvature of field and coma in good balance. When the curvature is small beyond the upper limit, large outward coma is generated. When the curvature becomes large beyond the upper limit, under-correction of field curvature results. These should be avoided.

The inequalities of condition (8) concern with the Abbe numbers of the materials of the positive first lens and the positive third lens in the fifth lens group, and have an aim of well correcting the residual chromatic aberrations of the zoom section. When the Abbe numbers are low beyond the lower limit, under-correction of longitudinal chromatic aberration results on the wide-angle side. When the Abbe numbers becomes large beyond the upper limit, the longitudinal chromatic aberration is over-corrected on the telephoto side.

Another rules of design for the fifth lens group are now set forth in order to achieve a further improvement of the optical performance throughout the entire zooming range, as follows.

That is, letting the i-th axial lens thickness or air separation in the fifth lens group be denoted by D5,i, the following conditions are satisfied:

$$-1.10 < R5,1/R5,3 < -0.95 \quad (9)$$

$$2.44 < R5,5/fW < 2.71 \quad (10)$$

$$1.66 < R5,8/fW < 1.91 \quad (11)$$

$$2.36 < R5,9/R5,11 < 5.22 \quad (12)$$

$$0.05 < D5,2/fW < 0.15 \quad (13)$$

$$1.70 < D5,6/fW < 2.00 \quad (14)$$

$$0.11 < D5,8/fW < 0.15 \quad (15)$$

The inequalities of condition (9) concern with the ratio of the radius of curvature of the first lens surface, counting from front, in the fifth lens group to the radius of curvature of the third lens surface and have an aim mainly of appropriately correcting spherical aberration. When the lower limit is exceeded, the spherical aberration is under-corrected. When the upper limit is exceeded, it is over-corrected.

The inequalities of condition (10) have an aim of efficiently converging a light beam without producing spherical aberration as far as possible. When the lower limit is exceeded, extremely large spherical aberration is generated. When the upper limit is exceeded, the converging effect becomes insufficient, inviting an unduly large increase of the total length of the entire lens system.

The inequalities of condition (11) have an aim of fulfilling the requirements of forming the entirety of the lens system to compact shape and of getting a good telecentric form of the optical system simultaneously without causing coma to be generated as far as possible. When the lower limit is exceeded, extremely large outward coma is generated, which is difficult to correct well. When a more telecentric form of the optical system than the upper limit is attained, the total length of the lens system is increased objectionably.

The inequalities of condition (12) have an aim of correcting field curvature and coma in good balance. When the lower limit is exceeded, the field curvature is under-corrected and, further, large inward coma is generated. When the upper limit is exceeded, the field curvature is over-corrected and, further, large outward coma is generated, which is difficult to correct well.

The inequalities of condition (13) have an aim of correcting spherical aberration and astigmatism. When the lower limit is exceeded, the astigmatism increases. When the upper limit is exceeded, higher order spherical aberrations are generated.

The inequalities of condition (14) concern with the air spacing between the front lens sub-group and the rear lens sub-group and have aims of correcting both of on-axial aberrations and off-axial aberrations in good balance and of attaining a telecentric form of the optical system. When the lower limit is exceeded, off-axial aberrations such as astigmatism and coma deteriorate, and the telecentric optical system is difficult to attain. When the upper limit is exceeded, spherical aberration and other on-axial aberrations are generated.

The inequalities of condition (15) have an aim mainly of correcting coma and distortion. When the lower limit is exceeded, outward coma is generated, which is difficult to correct well. When the upper limit is exceeded, large distortion of the barrel type is generated objectionably in the wide-angle end.

Next, numerical examples 1 and 2 of zoom lenses of the invention are shown. In the numerical examples 1 and 2, Ri is the radius of curvature of the i-th lens surface counting from front, Di is the i-th axial lens thickness of air separation counting from front, and Ni and $\nu$i are respectively the refractive index and Abbe number of the glass of the i-th lens element counting from front. The surfaces R31 and R32 define a face plate or filter.

The values of all the factors in the above-described conditions for the numerical examples are listed in Table-1.

NUMERICAL EXAMPLE 1 (FIGS. 1, 2(A), 2(B) AND 2(C))

| F = 1–14.25 | FNo = 1:1.4–2.4 | | 2ω = 51.5°–3.9° |
|---|---|---|---|
| R1 = 21.281 | D1 = 0.318 | N1 = 1.80518 | $\nu$1 = 25.4 |
| R2 = 7.500 | D2 = 1.090 | N2 = 1.62299 | $\nu$2 = 58.1 |
| R3 = −22.338 | D3 = 0.022 | | |
| R4 = 6.806 | D4 = 0.511 | N3 = 1.69680 | $\nu$3 = 55.5 |
| R5 = 17.451 | D5 = Variable | | |
| R6 = 21.600 | D6 = 0.147 | N4 = 1.83400 | $\nu$4 = 37.2 |
| R7 = 2.143 | D7 = 0.525 | | |
| R8 = −2.507 | D8 = 0.113 | N5 = 1.71299 | $\nu$5 = 53.8 |
| R9 = 2.507 | D9 = 0.420 | N6 = 1.84666 | $\nu$6 = 23.9 |
| R10 = −13.951 | D10 = Variable | | |
| R11 = −4.723 | D11 = 0.136 | N7 = 1.71999 | $\nu$7 = 50.3 |
| R12 = 5.239 | D12 = 0.340 | N8 = 1.74077 | $\nu$8 = 27.8 |
| R13 = −57.456 | D13 = Variable | | |
| R14 = 417.579 | D14 = 0.306 | N9 = 1.60311 | $\nu$9 = 60.7 |
| R15 = −6.719 | D15 = 0.017 | | |
| R16 = −751.176 | D16 = 0.397 | N10 = 1.60311 | $\nu$10 = 60.7 |
| R17 = −4.779 | D17 = 0.113 | | |
| R18 = Stop | D18 = 0.227 | | |
| R19 = 4.419 | D19 = 0.659 | N11 = 1.60311 | $\nu$11 = 60.7 |
| R20 = −6.396 | D20 = 0.096 | | |
| R21 = −4.374 | D21 = 0.170 | N12 = 1.80518 | $\nu$12 = 25.4 |
| R22 = 8.803 | D22 = 0.017 | | |
| R23 = 2.575 | D23 = 0.625 | N13 = 1.63854 | $\nu$13 = 55.4 |
| R24 = 26.985 | D24 = 1.819 | | |
| R25 = −9.851 | D25 = 0.102 | N14 = 1.83400 | $\nu$14 = 37.2 |
| R26 = 1.816 | D26 = 0.141 | | |
| R27 = 9.552 | D27 = 0.295 | N15 = 1.51633 | $\nu$15 = 64.1 |
| R28 = −2.760 | D28 = 0.017 | | |
| R29 = 1.920 | D29 = 0.386 | N16 = 1.57845 | $\nu$16 = 41.5 |
| R30 = −15.005 | D30 = 0.568 | | |
| R31 = ∞ | D31 = 0.681 | N17 = 1.51633 | $\nu$17 = 64.1 |

| F = 1–14.25 | FNo = 1:1.4–2.4 | | 2ω = 51.5°–3.9° |
|---|---|---|---|
| R32 = ∞ | | | |

| f | 1 | 7 | 14.25 |
|---|---|---|---|
| D5 | 0.19 | 5.66 | 6.50 |
| D10 | 6.88 | 0.34 | 0.77 |
| D13 | 0.31 | 1.38 | 0.11 |

Figure 3A:
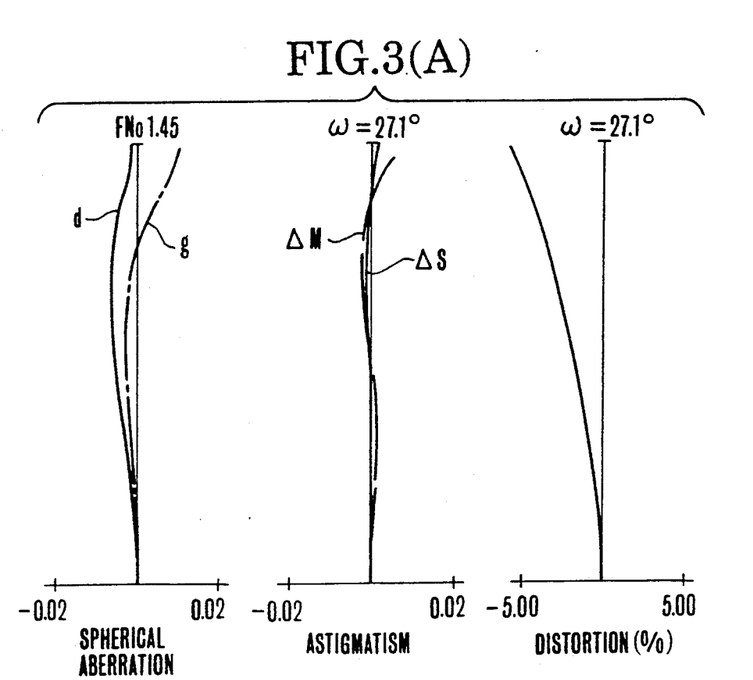
Figure 3B:
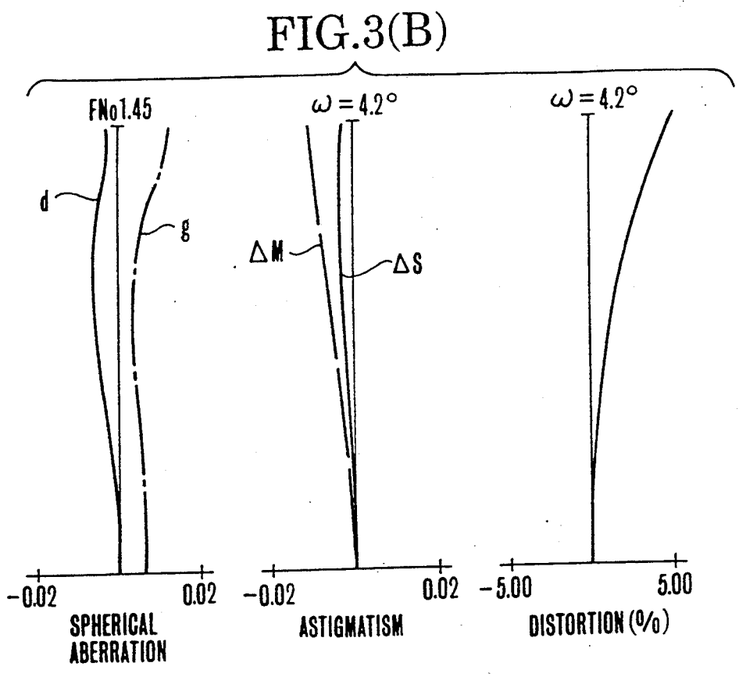
Figure 3C:
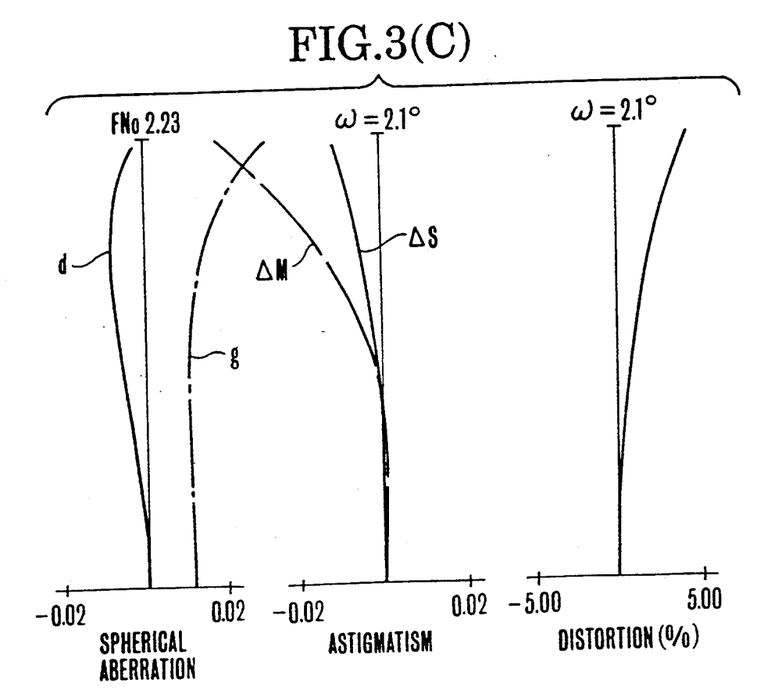

NUMERICAL EXAMPLE 2 (FIGS. 3(A), 3(B) AND 3(C))

| F = 1–14.25 | FNo = 1:1.4–2.2 | | 2ω = 54.2°–4.1° |
|---|---|---|---|
| R1 = 20.167 | D1 = 0.361 | N1 = 1.80518 | $\nu$1 = 25.4 |
| R2 = 7.454 | D2 = 1.277 | N2 = 1.62299 | $\nu$2 = 58.1 |
| R3 = −23.083 | D3 = 0.024 | | |
| R4 = 6.919 | D4 = 0.566 | N3 = 1.69680 | $\nu$3 = 55.5 |
| R5 = 17.655 | D5 = Variable | | |
| R6 = 12.257 | D6 = 0.156 | N4 = 1.83400 | $\nu$4 = 37.2 |
| R7 = 2.102 | D7 = 0.593 | | |
| R8 = −2.503 | D8 = 0.120 | N5 = 1.71299 | $\nu$5 = 53.8 |
| R9 = 2.503 | D9 = 0.457 | N6 = 1.84666 | $\nu$6 = 23.9 |
| R10 = −20.820 | D10 = Variable | | |
| R11 = −4.574 | D11 = 0.144 | N7 = 1.71999 | $\nu$7 = 50.3 |
| R12 = 5.379 | D12 = 0.349 | N8 = 1.74077 | $\nu$8 = 27.8 |
| R13 = −42.424 | D13 = Variable | | |
| R14 = 196.110 | D14 = 0.325 | N9 = 1.60311 | $\nu$9 = 60.7 |
| R15 = −6.643 | D15 = 0.018 | | |
| R16 = −86.240 | D16 = 0.433 | N10 = 1.56384 | $\nu$10 = 60.7 |
| R17 = −4.423 | D17 = 0.120 | | |
| R18 = Stop | D18 = 0.241 | | |
| R19 = 4.392 | D19 = 0.686 | N11 = 1.60311 | $\nu$11 = 60.7 |
| R20 = −6.414 | D20 = 0.100 | | |
| R21 = −4.317 | D21 = 0.180 | N12 = 1.80518 | $\nu$12 = 25.4 |
| R22 = 9.508 | D22 = 0.018 | | |
| R23 = 2.567 | D23 = 0.626 | N13 = 1.62299 | $\nu$13 = 58.1 |
| R24 = 23.255 | D24 = 1.881 | | |
| R25 = 17.936 | D25 = 0.108 | N14 = 1.83400 | $\nu$14 = 37.2 |
| R26 = 1.754 | D26 = 0.116 | | |
| R27 = 5.109 | D27 = 0.289 | N15 = 1.51633 | $\nu$15 = 64.1 |
| R28 = −3.264 | D28 = 0.018 | | |
| R29 = 2.048 | D29 = 0.373 | N16 = 1.60342 | $\nu$16 = 38.0 |
| R30 = −32.184 | D30 = 0.602 | | |
| R31 = ∞ | D31 = 0.722 | N17 = 1.51633 | $\nu$17 = 64.1 |
| R32 = ∞ | | | |

| f | 1 | 7 | 14.25 |
|---|---|---|---|
| D5 | 0.17 | 5.58 | 6.41 |
| D10 | 6.88 | 0.42 | 0.84 |
| D13 | 0.32 | 1.36 | 0.12 |

TABLE 1

| | | Numerical Example | |
|---|---|---|---|
| Condition No. | Factor | 1 | 2 |
| (a) | f4/L | 0.90 | 0.90 |
| (1) | (fT/f1)$^2$ | 2.21 | 2.19 |
| (2) | f2/fW | −1.86 | −1.84 |
| (3) | N1,3 | 1.70 | 1.70 |
| (4) | $\nu$3,1 − $\nu$3,2 | 22.5 | 22.5 |
| (5) | $\overline{\nu 4}$ | 60.7 | 60.7 |
| (6) | fW/R5,4 | 0.11 | 0.11 |
| (7) | fW/R5,7 | −0.10 | −0.06 |
| (8) | $\frac{\nu 5,1 + \nu 5,3}{2}$ | 58.1 | 59.4 |
| (9) | R5,1/R5,3 | −1.01 | −1.02 |
| (10) | R5,5/fW | 2.58 | 2.57 |
| (11) | R5,8/fW | 1.81 | 1.75 |
| (12) | R5,9/R5,11 | 4.97 | 2.49 |
| (13) | D5,2/fW | 0.10 | 0.10 |

TABLE 1-continued

| Condition No. | Factor | Numerical Example 1 | Numerical Example 2 |
| --- | --- | --- | --- |
| (14) | D5.6/fW | 1.82 | 1.88 |
| (15) | D5.8/fW | 0.14 | 0.12 |

It will be appreciated from the foregoing that according to the invention, with the use of the 5-group type in the zoom lens, by setting forth the rules of design for each of the lens groups as have been described before, it is made possible to achieve a zoom lens having as large a relative aperture as 1.4 in F-number and as high a range of 15 and well corrected for high optical performance, while still providing a possibility of advantageously removing the harmful light, which leads to ghost and flare, arising from the reflection from the surface of the image pickup device. Therefore, the zoom lens is suitable to the photographic camera or video camera.

What is claimed is:

1. A zoom lens comprising, in the order from the object side, a first lens group of positive refractive power, a second lens group of negative refractive power having the magnification varying function, a third lens group of negative refractive power for compensating for the shift of an image plane resulting from the variation of the magnification, a fourth lens group of positive refractive power for making the light beam from said third lens group to be a converging light beam, and a fifth lens group having the image forming function, said fifth lens group having, in the order from the object side, a front lens sub-group and a rear lens sub-group with a largest air spacing in said fifth lens group therebetween, said front lens sub-group having, in the order from the object side, a first lens of which both lens surfaces are convex, a negative second lens of concave curvature at the object side and a positive third lens of strong curvature at the object side, said rear lens sub-group having, in the order from the object side, a negative fourth lens of concave curvature at the image side, a fifth lens of strong curvature at the image side of which both lens surfaces are convex and a positive sixth lens of strong curvature at the object side of which both lens surfaces are convex, and said zoom lens satisfying the following condition:

$$0.7 < f4/L < 0.95$$

where L is the distance from an image point formed by said first to third lens groups to the front principal point of said fourth lens group, and f4 is the focal length of said fourth lens group.

2. A zoom lens according to claim 1, further comprising optical filter means positioned in a space between said fourth lens group and said fifth lens group.

3. A zoom lens according to claim 2, wherein said optical filter means is an ND filter.

4. A zoom lens according to claim 3, wherein said third lens group has a cemented lens composed of a negative first lens of which both lens surfaces are concave and a positive second lens either of which both lens surfaces are convex or of meniscus form convex toward the object side.

5. A zoom lens according to claim 4, wherein said fourth lens group has two positive lenses.

6. A zoom lens according to claim 4, wherein said first lens group has a cemented lens composed of a negative meniscus-shaped first lens convex toward the object side and a second lens of which both surfaces are convex and a positive meniscus-shaped third lens convex toward the object side, wherein said second lens group has a negative first lens of convex curvature at the object side, wherein a second lens of which both lens surfaces are concave and a positive third lens, said second lens and said third lens in said second lens group being cemented together, wherein said fourth lens group has positive first and second lenses both of strong curvature at the image side, and wherein letting the refractive index and Abbe number of the medium of the j-th lens in the i-th lens group, counting from the object side, be denoted by Ni,j and i,j respectively, the mean value of the Abbe numbers of the materials of said first and said second lenses in said fourth lens group by 4, the focal lengths of said first lens group and said second lens group by f1 and f2 respectively, and the shortest and longest focal lengths of the entire lens system by fW and fT respectively, the following conditions are satisfied:

$$2.0 < (fT/f1)^2 < 2.4$$

$$-1.96 < f2/fW < -1.75$$

$$1.65 < N1,3 < 1.75$$

$$21 < \nu3,1 - \nu3,2 < 24$$

$$55 < \nu4 < 75.$$

7. A zoom lens according to claim 6, wherein letting the radius of curvature of the i-th lens surface of said fifth lens group be denoted by R5,i, the following conditions are satisfied:

$$0.02 < fW/R5,4 < 0.21$$

$$-0.20 < fW/R5,7 < -0.01$$

$$55 < (\nu5,1 + \nu5,3)/2 < 70.$$

8. A zoom lens according to claim 7, wherein letting the i-th axial lens thickness or air separation, counting from the object side, in said fifth lens group be denoted by D5,i, the following conditions are satisfied:

$$-1.10 < R5,1/R5,3 < -0.95$$

$$2.44 < R5,5/fW < 2.71$$

$$1.66 < R5,8/fW < 1.91$$

$$2.36 < R5,9/R5,11 < 5.22$$

$$0.05 < D5,2/fW < 0.15$$

$$1.70 < D5,6/fW < 2.00$$

$$0.11 < D5,8/fW < 0.15.$$

9. A zoom lens comprising, in the order from the object side,
   a first lens group having a positive refractive power;
   a second lens group having a negative refractive power and movable along an optical axis for zooming;
   a third lens group for compensating for the shift of an image caused by the movement of said second lens group;

a fourth lens group having a positive refractive power;
optical filter means; and
a fifth lens group having a positive refractive power, wherein the following condition is satisfied:

$$0.7 < f4/L < 0.95$$

where L is the distance from an image point formed by said first to third lens groups to the front principal point of said fourth lens group, and f4 is the focal length of said fourth lens group.

10. A zoom lens according to claim 9, wherein said optical filter means is an ND filter.

11. A zoom lens according to claim 9, wherein said third lens group has a cemented lens composed of a negative first lens of which both lens surfaces are concave and a positive second lens either of which both lens surfaces are convex or of meniscus form convex toward the object side.

12. A zoom lens according to claim 9, wherein said fourth lens group has two positive lenses.

13. A zoom lens according to claim 12, wherein said first lens group has a cemented lens composed of a negative meniscus-shaped first lens convex toward the object side and a second lens of which both lens surfaces are convex and a positive meniscus-shaped third lens convex toward the object side, wherein said second lens group has a negative first lens of convex curvature at the object side, a second lens of which both lens surfaces are concave, and a positive third lens, said second lens and said third lens in said second lens group being cemented together, wherein said fourth lens group has positive first and second lenses both of strong curvature at the image side, and wherein letting the refractive index and Abbe number of the medium of the j-th lens in the i-th lens group, counting from the object side, be denoted by $Ni,j$ and $vi,j$ respectively, the mean value of the Abbe numbers of the materials of said positive first and second lenses in said fourth lens group by $v4$, the focal lengths of said first lens group and said second lens group by f1 and f2 respectively, and the shortest and longest focal lengths of the entire lens system by fW and fT respectively, the following conditions are satisfied:

$$2.0 < (fT/f1)^2 < 2.4$$

$$-1.96 < f2/fW < -1.75$$

$$1.65 < N1.3 < 1.75$$

$$21 < v3,1 - v3,2 < 24$$

$$55 < v4 < 75.$$

14. A zoom lens according to claim 13, wherein said fifth lens group has, in the order from the object side, a front lens sub-group and a rear lens sub-group with a largest air spacing in said fifth lens group therebetween, said front lens sub-group having, in the order from the object side, a first lens of which both lens surfaces are convex, a negative second lens of concave curvature at the object side and a positive third lens of strong curvature at the object side, and said rear lens sub-group having a negative fourth lens of concave curvature at the image side, a fifth lens of strong curvature at the image side of which both lens surfaces are convex and a positive sixth lens of strong curvature at the object side of which both lens surfaces are convex.

15. A zoom lens according to claim 14, wherein letting the radius of curvature of the i-th lens surface of said fifth lens group be denoted by $R5,i$, the following conditions are satisfied:

$$0.02 < fW/R5,4 < 0.21$$

$$-0.20 < fW/R5,7 < -0.01$$

$$55 < (v5,1 + v5,3)/2 < 70.$$

16. A zoom lens according to claim 15, wherein letting the i-th axial lens thickness or air separation, counting from the object side, in said fifth lens group be denoted by $D5,i$, the following conditions are satisfied:

$$-1.10 < R5,1/R5,3 < -0.95$$

$$2.44 < R5,5/fW < 2.71$$

$$1.66 < R5,8/fW < 1.91$$

$$2.36 < R5,9/R5,11 < 5.22$$

$$0.05 < D5,2/fW < 0.15$$

$$1.70 < D5,6/fW < 2.00$$

$$0.11 < D5,8/fW < 0.15.$$

* * * * *

UNITED STATES PATENT AND TRADEMARK OFFICE
CERTIFICATE OF CORRECTION

PATENT NO. : 5,095,387
DATED : March 10, 1992
INVENTOR(S) : AKIHISA HORIUCHI It is certified that error appears in the above-identified patent and that said Letters Patent is hereby corrected as shown below:

<u>Column 6</u>

Line 15, "becomes" should read --become--.

Line 18, "Another rules" should read --Other rules--.

<u>Column 8</u>

Numerical Example 2, "R25 = 17.926" should read --R25 = -17.926--.

Signed and Sealed this

Sixth Day of July, 1993

Attest:

MICHAEL K. KIRK

*Attesting Officer*        Acting Commissioner of Patents and Trademarks